US006328939B1

(12) United States Patent
Amrhein

(10) Patent No.: US 6,328,939 B1
(45) Date of Patent: Dec. 11, 2001

(54) MERCURY REMOVAL IN UTILITY WET SCRUBBER USING A CHELATING AGENT

(75) Inventor: Gerald T. Amrhein, Louisville, OH (US)

(73) Assignee: McDermott Technology, Inc., New Orleans, LA (US)

(*) Notice: Subject to any disclaimer, the term of this patent is extended or adjusted under 35 U.S.C. 154(b) by 0 days.

(21) Appl. No.: 09/282,816

(22) Filed: Mar. 31, 1999

(51) Int. Cl.[7] .................................................... B01D 53/64
(52) U.S. Cl. ............................................................ 423/210
(58) Field of Search ................................... 423/210, 215.5

(56) References Cited

U.S. PATENT DOCUMENTS

| | | | |
|---|---|---|---|
| 3,855,387 | 12/1974 | Brockmiller et al. | 423/210 |
| 3,892,837 | 7/1975 | Uchiyama et al. | 423/242 |
| 3,981,972 | 9/1976 | Hishinuma et al. | 423/244 |
| 4,098,697 | 7/1978 | DeAngelis et al. | 210/202 |
| 4,190,709 | 2/1980 | Hodgkin | 521/39 |
| 4,230,183 | 10/1980 | Kalfoglou | 166/274 |
| 4,273,747 | 6/1981 | Rasmussen | 423/210 |
| 4,285,819 | 8/1981 | Yen et al. | 210/679 |
| 4,377,484 | 3/1983 | Nasrallah | 210/698 |
| 4,578,195 | 3/1986 | Moore et al. | 210/679 |
| 4,857,183 | 8/1989 | Bommer | 210/127 |
| 4,889,698 | 12/1989 | Moller et al. | 423/210 |
| 4,889,701 | 12/1989 | Jones et al. | 423/220 |
| 4,975,264 | 12/1990 | Franken | 423/522 |
| 5,139,982 | 8/1992 | Ayala et al. | 502/182 |
| 5,168,065 | 12/1992 | Jankura et al. | 436/55 |
| 5,238,665 | 8/1993 | Lerner | 423/240 S |
| 5,246,471 | 9/1993 | Bhat et al. | 55/223 |
| 5,308,509 | 5/1994 | Bhat et al. | 210/770 |
| 5,354,363 | 10/1994 | Brown, Jr. et al. | 95/134 |
| 5,357,002 | 10/1994 | Lezzi et al. | 525/332.2 |
| 5,405,593 | 4/1995 | Knudson | 423/244.03 |
| 5,428,154 | 6/1995 | Gansow et al. | 540/465 |
| 5,500,196 | 3/1996 | Rogers et al. | 423/242.1 |
| 5,520,897 | 5/1996 | Rogers et al. | 423/242.1 |
| 5,564,105 | 10/1996 | Alvino et al. | 588/20 |
| 5,622,996 | 4/1997 | Fish | 521/33 |
| 5,672,323 | 9/1997 | Bhat et al. | 422/172 |
| 5,795,548 | 8/1998 | Madden et al. | 422/171 |
| 5,814,288 | 9/1998 | Madden et al. | 423/244.01 |
| 5,827,352 | 10/1998 | Altman et al. | 95/58 |
| 5,834,525 | 11/1998 | Fish | 521/33 |

FOREIGN PATENT DOCUMENTS 62-453325 A * 2/1987 (JP) ................................. 423/210
5-23540 A * 2/1993 (JP).

OTHER PUBLICATIONS

English Translation of Japan Patent Document No. 62–45, 325 A, Feb. 1987.*

J. Peterson et al., "Mercury Removal by Wet Limestone FGD Systems: EPRI HSTC Test Results," 94–RP114B.01, presented at the 87th Annual Meeting & Exhibition of Air & Waste Managegment Association, Cincinnati, Ohio, Jun. 19–24, 1994, pp. 1–16.

R. Chang, et al., "Pilot Scale Evaluation of Activatied Carbon for the Removal of Mercury at Coal–Fired Utility Power Plants ," presented at the 2nd International Hazard Pollution Management, Washington, DC, Jul. 13–15, 1993, pp. 1–17.

B. K. Gullett, et al., "Bench–Scale Sorption and Desorption of Mercury with Activated Carbon," presented at International Conference MWC, Williamsburg, VA, Mar. 30–Apr. 2, 1993, 8 pages.

A. Licata et al., "An Economic Alternative to Controlling Acid Gases, Mercury and Dioxin from MWCs," 94–MP17.06, presented at the 87th Annual Meeting & Exhibition for Air & Waste Management Association,Cincinnati, OPhio, Jun. 19–24, 1994, pp. 1–21.

R. Chang et al., "Sorbent Injection for Flue Gas Mercury Control," 94–WA68A.01, presented at the Air & Waste Management Association Conference, Cincinnati, Ohio, Jun. 1994, 13 pages.

C. Jones, "Consensus on air toxics eludes industry to date," *Power*, Oct. 1994, pp. 51–52, 55–56, 58–59.

J. R. Morency, "Control of Mercury in Fossil Fuel–Fired Power Generation," presented at DOE Contractors Meeting, Pittsburgh, PA, Jul. 21, 1994, pp. 1–7.

(List continued on next page.)

*Primary Examiner*—Steven P. Griffin
*Assistant Examiner*—Timothy C Vanoy
(74) *Attorney, Agent, or Firm*—Robert C. Baraona; Eric Marich

(57) ABSTRACT

A method for capturing and reducing the mercury content of an industrial flue gas such as that produced in the combustion of a fossil fuel or solid waste adds a chelating agent, such as ethylenediaminetetraacetic acid (EDTA) or other similar compounds like HEDTA, DTPA and/or NTA, to the flue gas being scrubbed in a wet scrubber used in the industrial process. The chelating agent prevents the reduction of oxidized mercury to elemental mercury, thereby increasing the mercury removal efficiency of the wet scrubber. Exemplary tests on inlet and outlet mercury concentration in an industrial flue gas were performed without and with EDTA addition. Without EDTA, mercury removal totaled 42%. With EDTA, mercury removal increased to 71%. The invention may be readily adapted to known wet scrubber systems and it specifically provides for the removal of unwanted mercury both by supplying $S^{2-}$ ions to convert $Hg^{2+}$ ions into mercuric sulfide (HgS) and by supplying a chelating agent to sequester other ions, including but not limited to $Fe^{2+}$ ions, which could otherwise induce the unwanted reduction of $Hg^{2+}$ to the form, $Hg^0$.

9 Claims, 3 Drawing Sheets

OTHER PUBLICATIONS

*Steam/its generation and use*, 40th Edition, The Babcock & Wilcox Company, ©1992, pp.:cover, ii, 35–1 thru 35–16. ISBN 0–9634570–0–4.

K. E. Redinger et al., "Mercury Emissions Control in RGD Systems," presented at the EPRI/DOE/EPA Combined Utility Air Pollutant Control Symposium, Washington, DC, Aug. 25–29, 1997, 17 pages.

M. J. Holmes, etal., "Advanced Emissions Control Development Program," presented at the Advanced Coal–Based Power and Environmental Systems '98 Conference, Morgantown, West VA, Jul. 21–23, 1998, 16 pages.

G. A. Farthing et al., "B&W's Advanced Emissions Control Development Program," presented at the 20th International Technical Conference on Coal Utilization & Fuel Systems, Clearwater, Florida, Mar. 20–23, 1995, 12 pages.

R.D. Vidic and J. B. McLaughlin, "Uptake of Elemental Mercury Vapors by Activated Carbons," *Journal of the Air and Waste Management Association*, vol. 46, Mar. 1996, pp. 241–250.

J. G. Noblett, Jr. et al, "Control of Air Toxics from Coal–Fired Power Plants Using FPG Technology," presented at the RPRI Second International Conference on Managing Hazardous Air Pollutants, Washington, DC, Jul. 1999, 15 pages.

R. Chang and D. Owens, "Developing Mercury Removal Methods for Power Plants," *EPRI Journal*, Jul./Aug. 1994, pp. 46–49.

K. Felsvang et al., "Air Toxics Control by Spray Dryer Absorption Systems," presented at Power–Gen '92, Orlando, FL, Nov. 1992, pp. VI–1 thru VI–17.

R. Change and G. R. Offen, Mercury emission control technologies: An EPRI synopsis, *Power Engineering*, Nov. 1995, pp. 51–57.

"Emission Factors Handbook: Guidelines for Estimating Trace Substance Emissions form Fossil Fuel Steam Electric Plants," *EPRI*, TR–105611s, Nov. 1995, pp.: Cover, Report Summary, 2, 2–11, 2–12, and 2–13.

Advertisement by The Dow Chemical Company, "Properties of EDTA, DTPA, HEDTA, and NTA", 1974, 2 pages. Form No. 192–380–75.

E. H. Hall, Status Report from Battelle Memorial Institute, Columbus Ohio, "Mercury Emissions and Controls," May 1, 1994, 94TEC–1, 49 pages.

R. Meu, "The Fate of Mercury in Coal–Fired Power Plants and the Influence of Wet Flue–Gas Desulphurization," *Water, Air and Soil Pollution*, 56:21–33, 1991, pp. 21–29.

R. Gleiser et al, "Mercury Emission Reduction Using Activated Carbon with Spray Dryer Flue Gas Desulfurization," presented at 36th Annual Meeting American Power Conference, Chicago, Apr. 25*27, 1994, pp. 452–457.

R. Gleiser et al, "Control of Mercury from MSW Combustors by Spray Dryer Absorption Systems and Activated Carbon Injection," MSW Conference Proceedings, Williamsburg, VA, 1993, pp. 106–122.

K. E. Redinger and A. P. Evans, "Mercury Speciation and Emissions Control in FGD Systems," presented at the 22nd International Technical Conference on Coal Utilization & Fuel Systems, Mar. 17–20, 1997.

M. J. Holmes et al., "Control of Mercury in Conventional Flue Gas Emissions Control Systems," presented at the Managing Hazardous Air Pollutants Conference, Washingtion, DC, Nov. 12–14, 1997, 17 pages.

K. E. Redinger et al., "Mercury Emissions Control in RGD Systems," presented at the EPRI/DOE/EPA Combined Utility Air Control Symposium, Washington DC, Aug. 25–29, 1997, pp. 1–17.

C. D. Livengood et al., "Improved Mercury Control in Wet Scrubbing Through Modified Speciation," presented at the EPRI/DOE/EPA Combined Utility Air Pollutant Control Symposium, Washington, DC, Aug. 25–29, 1997, 16 pages.

* cited by examiner

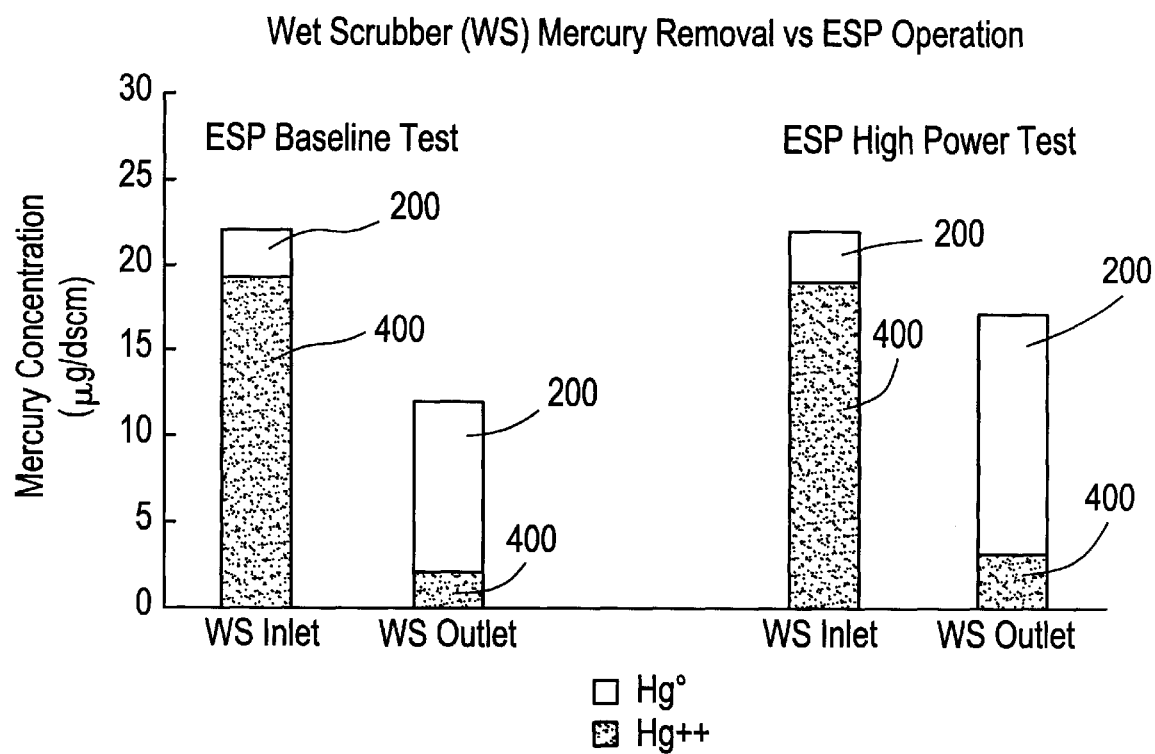

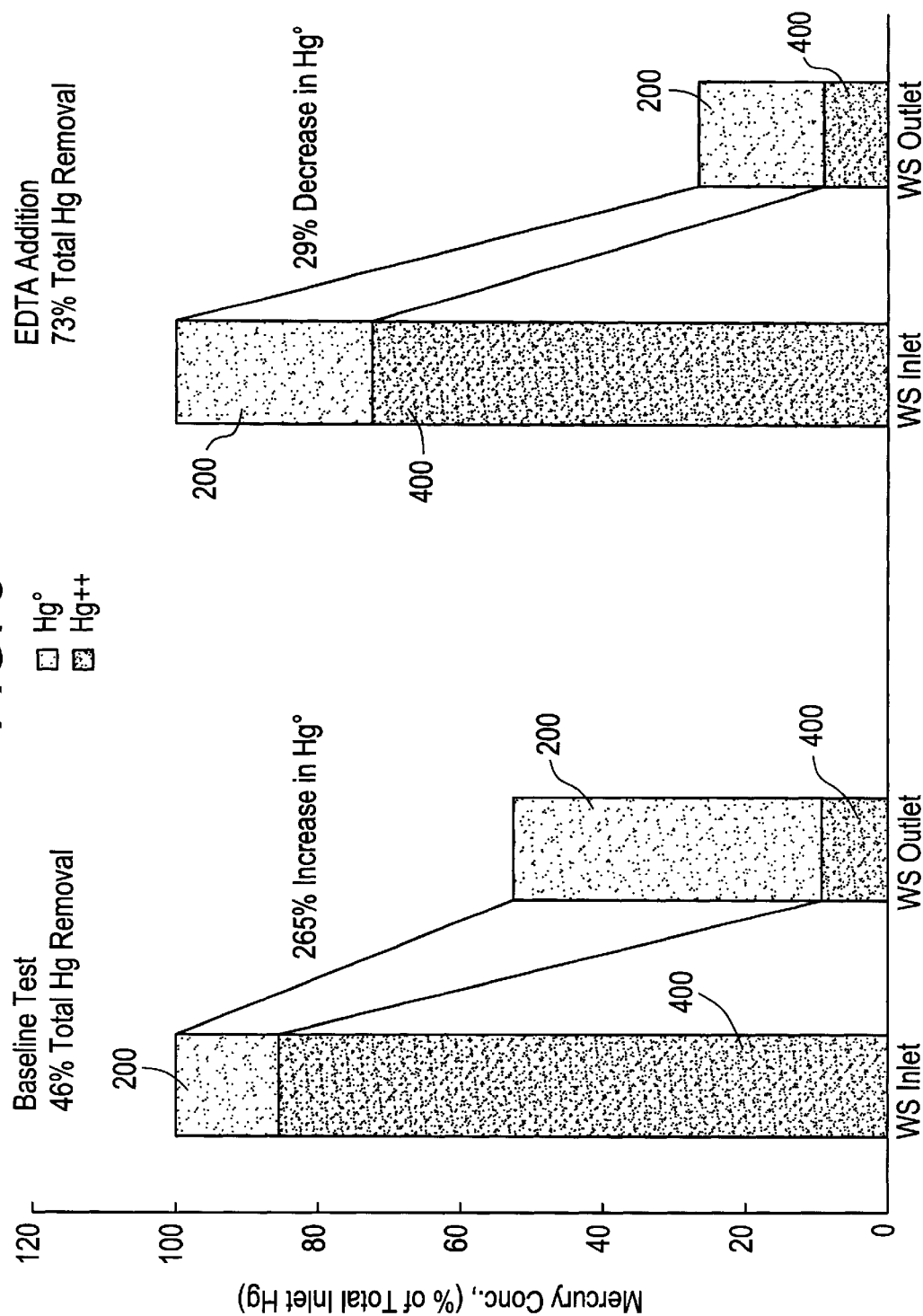

MERCURY REMOVAL IN UTILITY WET SCRUBBER USING A CHELATING AGENT

The subject matter of the present invention was developed under a research contract with the U.S. Department of Energy (DOE), Contract No. DE-FC22-94PC94251, and under a grant agreement with the Ohio Coal Development Office (OCDO), Grant Agreement No. CDO/D-922-13. The governments of the United States and Ohio have certain rights in the invention.

FIELD AND BACKGROUND OF THE INVENTION

The present invention relates generally to the field of flue gas cleanup methods and apparatus and, in particular, to a method for removing mercury from the flue gas generated during the combustion of fossil fuels or solid wastes, through the use of a chelating agent.

In recent years, the U.S. Department of Energy (DOE) and the U.S. Environmental Protection Agency (EPA) have supported research to measure and control the emissions of Hazardous Air Pollutants (HAPs) from coal-fired utility boilers. The initial results of several research projects showed that the emissions of heavy metals and volatile organic carbons (VOCs) are very low, except for mercury (Hg). Unlike most of the other metals, most of the mercury remains in the vapor phase and does not condense onto fly ash particles at temperatures typically used in electrostatic precipitators and fabric filters. Therefore, it cannot be collected and disposed of along with fly ash like the other metals. To complicate matters, mercury can exist in its oxidized ($Hg^{+2}$) or elemental ($Hg^0$) form and each is affected differently by subsequent downstream pollution control equipment. In a conventional wet scrubber $Hg^{+2}$ is relatively easy to capture while capturing $Hg^0$ is difficult. The relative amount of each species appears to depend on several factors such as fuel type, boiler combustion efficiency, the type of particulate collector installed, and several other factors. As for the type of particulate collector installed, it has been shown that an electrostatic precipitator (ESP), as is used in the majority of utility applications, affects the process chemistry so that $Hg^{+2}$ is converted to $Hg^0$ within a downstream wet scrubber, also commonly used in utility applications to reduce $SO_2$ emissions. The $Hg^0$ is then emitted with the flue gas.

Most of the recent efforts to capture and remove mercury from flue gas have concentrated on gas-phase reactions with introduced reagents such as activated carbon.

The subject of mercury emissions by the utility industry is a new area being investigated by both the DOE and EPA.

SUMMARY OF THE INVENTION

The present invention is a method to adjust wet scrubber chemistry to prevent the reduction of $Hg^{+2}$ to $Hg^0$ and thereby increase the mercury removal efficiency of wet scrubber systems. The invention increases the mercury removal efficiency of conventional wet scrubber systems, especially those preceded by an ESP.

Accordingly, one aspect of the present invention is to provide, in an industrial process using a wet scrubber for receiving an industrial gas containing mercury, a method for reducing the mercury content in the industrial gas exiting from the wet scrubber, comprising: adding a chelating agent to the industrial gas; and scrubbing the industrial gas in the wet scrubber with the chelating agent.

Advantageously, the chelating agent comprises at least one of ethylenediaminetetraacetic acid (EDTA), hydroxyethylenediaminetetraacetic acid (HEDTA), diethylenetriaminepentaacetic acid (DTPA or pentetic acid), and nitrilotriacetic acid (NTA). Pilot-scale testing employed EDTA, and an amount of about twice the stoichiometric ratio of chelating agent to the transition metals (presumed to be iron, Fe) was shown to be effective.

Another aspect of the present invention is drawn to a method for reducing elemental mercury concentration in industrial gases exiting from a wet scrubber which scrubs the industrial gases with a slurry, the industrial gases containing mercury in oxidized ($Hg^{+2}$) and elemental ($Hg^0$) forms, the wet scrubber containing at least one transition metal which converts the $Hg^{+2}$ into the $Hg^0$ form, comprising the steps of: supplying a chelating agent in the slurry an amount sufficient to reduce the degree to which the at least one transition metal converts the $Hg^{+2}$ into the $Hg^0$ form; and scrubbing the industrial gases with the slurry containing the chelating agent.

In certain aspects of the present invention, the method may comprise determining the amount of the at least one transition metal in the wet scrubber slurry and supplying the chelating agent into the slurry in an amount sufficient to reduce the degree to which the at least one transition metal converts the $Hg^{+2}$ into the $Hg^0$ form based upon such determination.

In other aspects of the present invention, the method may comprise determining the concentration of oxidized ($Hg^{+2}$) and elemental ($Hg^0$) forms of mercury in the industrial gases entering and exiting from the wet scrubber and supplying the chelating agent into the slurry in an amount sufficient to reduce the degree to which the at least one transition metal converts the $Hg^{+2}$ into the $Hg^0$ form based upon such determination.

Yet still another aspect of the present invention is drawn to a method of operating a wet scrubber to reduce gaseous emissions of oxidized ($Hg^{+2}$) and elemental ($Hg^0$) mercury in industrial gases exiting from the wet scrubber, comprising: scrubbing the industrial gases within the wet scrubber with a slurry containing an amount of chelating agent sufficient to reduce the degree to which the at least one transition metal in the wet scrubber slurry converts the $Hg^{+2}$ into the $Hg^0$ form.

A still further aspect of the present invention is to improve removal of mercury from flue gas in a process which burns pulverized coal.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which a preferred embodiment of the invention is illustrated.

BRIEF DESCRIPTION OF THE DRAWINGS

In the drawings:

FIG. 2 is a bar chart plotting mercury concentration at a wet scrubber inlet and outlet, at two power levels, in a pilot facility using an ESP; and FIG. 3 is a bar chart similar to FIG. 2, but showing the improved results achieved through the use of the method according to the present invention.

DESCRIPTION OF THE PREFERRED EMBODIMENTS

Figure 1:
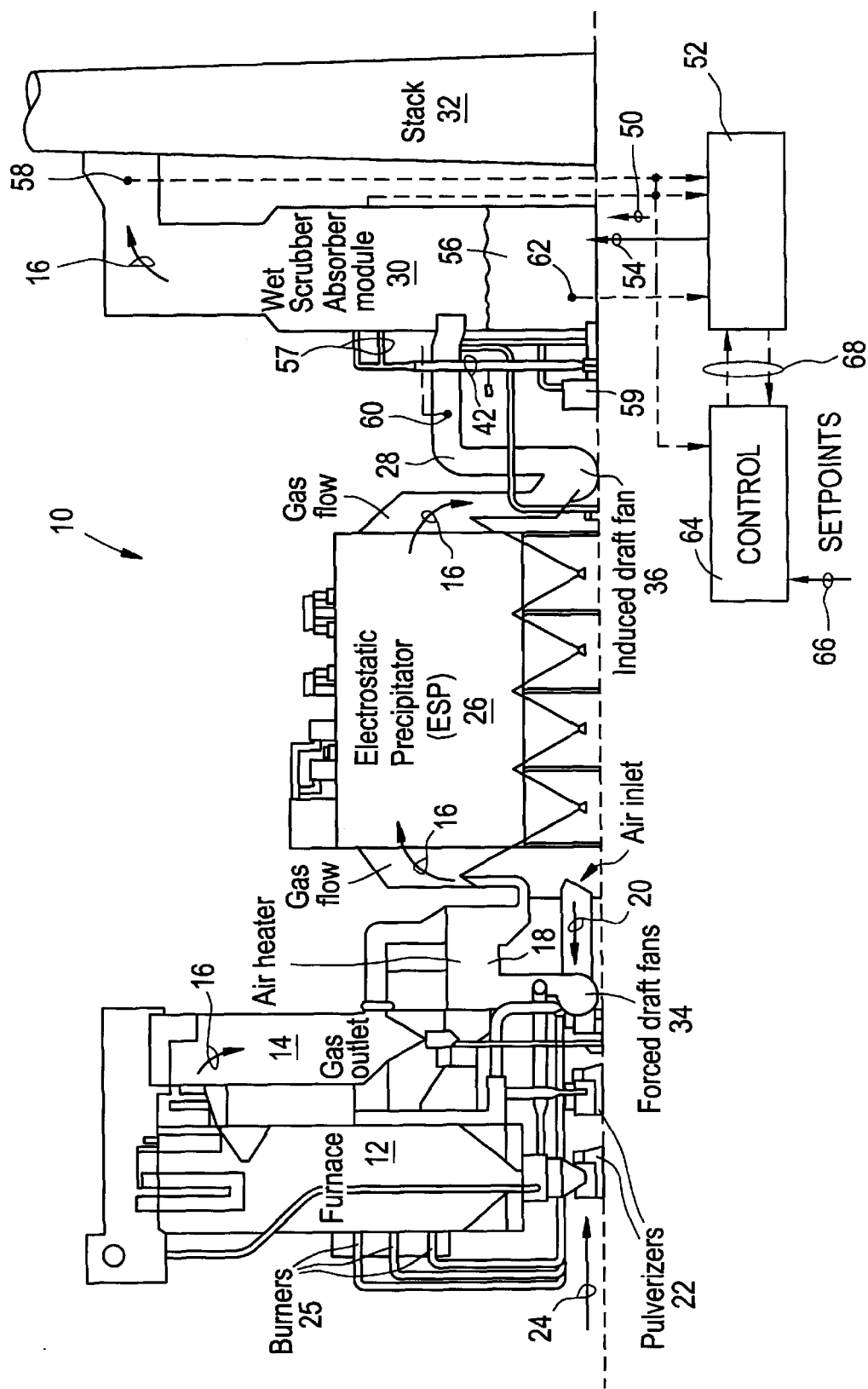
FIG. 1 is an illustration of a coal-fired utility boiler installation of the type used by utilities in the generation of electric power.

In February and April of 1998, McDermott Technology, Inc. conducted tests, sponsored by the Ohio Coal Development Office (OCDO) and the U.S. Department of Energy (DOE), at its pilot combustion and wet scrubber facility. The purpose of the tests was to study how mercury was affected by conventional pollution control equipment and to investigate various means of improving mercury capture with such conventional equipment. The research focused on the combination of an ESP followed by a wet scrubber because this is the system most commonly employed by utilities.

Referring to the drawings generally, wherein like reference numerals designate the same or functionally similar parts throughout the several drawings, FIG. 1 illustrates a coal-fired utility boiler installation of the type used by utilities in the generation of electric power, generally designated 10, and which represents one type of industrial process to which the present invention is applicable. In its broadest form, the present invention comprises a method for removing mercury from the flue gas generated during the combustion of fossil fuels or solid wastes through the use of a chelating agent. Of course, while the aforementioned coal-fired utility boiler installations are but one example, and the method of the present invention will likely first find commercial application to the removal of mercury from the flue gases produced by such utility boiler installations which combust such fossil fuels, any industrial process using a wet scrubber type of absorber module to purify such flue gases may benefit. Such processes could include incineration plants, waste to energy plants, or other industrial processes which generate gaseous products containing mercury. Thus for the sake of convenience, the terms industrial gas, flue gas, or just gas will be used in the following discussion to refer to any gas from an industrial process and from which an objectionable component, such as mercury, is to be removed.

As illustrated in FIG. 1, and proceeding in the direction of flue gas flow generated during the combustion process, the boiler installation 10 includes a furnace 12 having a gas outlet 14 which conveys flue gases, generally designated 16, to an air heater 18 used to preheat incoming air 20 for combustion. Pulverizers 22 grind a fossil fuel 24 (e.g., coal) to a desired fineness and the pulverized coal 24 is conveyed via burners 25 into the furnace 12 where it is burned to release heat used to generate steam for use by a steam turbine-electric generator (not shown). Flue gas 16 produced by the combustion process are conveyed through the gas outlet 14 to the air heater 18 and thence to various types of downstream flue gas cleanup equipment. The flue gas cleanup equipment may comprise a fabric filter or, as shown, an electrostatic precipitator (ESP) 26 which removes particulates from the flue gas 16. A flue 28 downstream of the ESP 26 conveys the flue gas 16 to a wet scrubber absorber module 30 which is used to remove sulfur dioxide and other contaminants from the flue gas 16. Flue gas 16 exiting from the wet scrubber absorber module or, simply, the wet scrubber 30, is conveyed to a stack 32 and exhausted to atmosphere. Forced draft fans 34 and induced draft fans 36 are used to propel the air 20, fuel 24, and flue gases 16 through the installation 10. For further details of various aspects of such installations 10, the reader is referred to *STEAM its generation and use,* 40th Ed., Stultz and Kitto, Eds., Copyright © 1992 The Babcock & Wilcox Company, particularly to Chapter 35—Sulfur Dioxide Control, the text of which is hereby incorporated by reference as though fully set forth herein. While the aforementioned *STEAM* reference contains a description of one form of wet scrubber 30 produced by The Babcock & Wilcox Company (B&W) and to which the present invention is applicable, the present invention is not limited to such B&W wet scrubber designs. Persons skilled in the art will appreciate that the principles of the present invention apply equally well to other types of wet scrubber designs, available from other manufacturers.

Referring again generally to FIG. 1, and to FIGS. 2 and 3 in particular, it has been found that an ESP affects the process chemistry so that $Hg^{+2}$ is converted to $Hg^0$ within a downstream wet scrubber. FIG. 2 shows the vapor-phase mercury concentration of both $Hg^{+2}$ and $Hg^0$ measured at the inlet of a pilot wet scrubber (not shown) at the McDermott Technology, Inc. Alliance Research Center in Alliance, Ohio for the cases when the ESP was operated normally ("ESP Baseline Test") and when it was operated at high voltage levels ("ESP High Power Test"). In each bar graph of FIGS. 2 and 3, the $Hg^0$ concentration is designated 200, while the $Hg^{+2}$ concentration is designated 400. FIG. 2 clearly shows that the electric field in the ESP has a negative impact on the mercury collection efficiency of the wet scrubber, but does not directly affect mercury speciation of the flue gas. The relative amount of the different mercury species at the wet scrubber inlet is the same for both cases. However, the amount of $Hg^0$ greatly increases across the wet scrubber for the high power test. This indicates that the electric field affects some component of the flue gas which, in turn, has a negative impact on the wet scrubber chemistry. Since Hg is present in such small quantities, it is likely that the affected component is also present in small quantities.

A possible mechanism that explains the observed results is presented below. In this scenario, the electric field within the ESP creates ozone (this is known to occur). The ozone then destroys hydrogen sulfide ($H_2S$), which is present in small quantities, and is thus unavailable to capture $Hg^{+2}$ as mercuric sulfide (HgS). $Hg^{+2}$ is subsequently converted to $Hg^0$ by some transition metal. For example, in the case of iron (Fe):

In the ESP:

$H_2S + O_3 \rightarrow H_2O + SO_2$ Ozone created by the strong electrical field destroys $H_2S$ In the Wet Scrubber:

$H_2S \rightarrow 2H^+ + S^{-2}$ $H_2S$ dissociates in the wet scrubber $S^{-2} + Hg^{+2} \rightarrow HgS$ $H_2S$ contributes to Hg removal $2Fe^{+2} + Hg^{+2} \rightarrow 2Fe^{+3} + Hg^0$ $Fe^{+2}$ reduces $Hg^{+2}$ to $Hg^0$.

The present invention is believed to block the action of transition metals by the use of a chelating agent, particularly ethylenediaminetetraacetic acid (EDTA). As set forth below, one possible mechanism could be as follows:

$2Fe^{+2} + EDTA^{-4} \rightarrow [2Fe(EDTA)]$ sequesters $Fe^{+2}$ species and prevents it from reducing $Hg^{+2}$.

The use and effect of chelating reagents are well known; however, to the inventor's knowledge they have never been applied in this industry for the purpose of improving mercury capture within conventional wet scrubbers 30. The present invention involves the discovery that chelating agents can be used to unexpectedly improve mercury capture in conventional wet scrubbers 30 located downstream (with respect to a direction of flue gas flow 16) of an ESP 26. The exact mechanism by which an ESP 26 affects the process chemistry and causes additional $Hg^{+2}$ to be converted to $Hg^0$ within the wet scrubber 30 is not important. Indeed, it is possible that the chelating agent may be acting directly on the mercury species, as well, alone or in combination with actions on the transition metals as postulated above. What is important, however, is that, by some mechanism, $Hg^{+2}$ is being converted to $Hg^0$ and that a chelating agent can be used to prevent it. The most likely mechanism by which this occurs probably involves a transition metal and, most likely, iron.

EXAMPLE

Chelating agents are known to sequester transition metals, however, in the thick chemical soup that describes wet scrubber slurry, the action of a chelating agent could not be predicted. The chemistry of limestone scrubbing is very complicated due to the many species present at equilibrium. The flue gas and limestone, plus fly ash from coal-burning boilers, each contribute several constituents that affect the chemical makeup of the system. $SO_2$, $SO_3$, $CO_2$, $O_2$, NO and $NO_2$ originate from the flue gas; K, Cl, Fe, and other chemicals arrive with the fly ash; and the limestone contains Ca, Mg and several other minor constituents such as Na and K. Therefore, a chelating agent, ethylenediaminetetraacetic acid (EDTA), was added to the reaction tank of a pilot-scale wet scrubber, and mercury concentration was measured at the inlet and outlet of the wet scrubber.

The test was conducted at the McDermott Technology, Inc., pilot-scale, Clean Environment Development Facility (CEDF) operated at a nominal heat input of approximately 100 million Btu/hr. Pulverized coal, ground to approximately 75% less than 200 mesh, was burned in a B&W low-NOx, plug-in burner at a coal flow rate of approximately 4 tons per hour to generate flue gas for the test.

After passing through an ESP, the flue gas flowed through a wet scrubber comprising a slurry recirculation tank, a reagent feed system, and a mist eliminator wash system all of known design. Pulverized limestone was mixed with make-up water in a reagent feed tank to maintain a solids content of the recirculating slurry at about 12–15%.

Ten pounds of a chelating agent, EDTA, were added to the wet scrubber slurry recirculation tank, containing 1,200 gallons of slurry, to produce a solution containing approximately 2 moles chelating agent per estimated mole of transition metal, such as iron, in the wet scrubber slurry or approximately twice the amount needed based on stoichiometry. This solution was introduced into the scrubber at a rate of about 120 gallons per minute per 1000 actual cubic feet per minute of mercury-containing flue gas.

FIG. 3 shows how EDTA affected the wet scrubber chemistry. Before EDTA was added, a large portion of $Hg^{+2}$ was being converted to $Hg^0$. After EDTA was added, the concentration of $Hg^0$ at the wet scrubber outlet was reduced to levels similar to that at the wet scrubber inlet that indicates no new $Hg^0$ was formed in the wet scrubber. FIG. 3 also shows that EDTA did not affect the normal removal efficiency of $Hg^{+2}$. The net result was that total mercury removal across the wet scrubber improved from 46% to 73% with the introduction of EDTA.

Referring again to FIG. 1, the method according to the present invention can be easily adapted to an existing installation 10 using a wet scrubber 30. The preferred chelating agent, generally designated 50, according to the present invention is EDTA. Other suitable chelating agents include, but are not limited to: hydroxyethylenediaminetetraacetic acid (HEDTA), diethylenetriaminepentaacetic acid (DTPA or pentetic acid), or nitrilotriacetic acid (NTA). The salt or acid forms of the chelating agents are suitable for use in the present invention. The chelating agent 50 could be provided from a chelating feed system, generally designated 52, via a line 54 into the wet scrubber slurry 56 contained in a lower portion of the wet scrubber 30. Recirculating pumps 59 continuously pump the wet scrubber slurry 56 from the lower portion to upper headers 57 located within an upper portion of the wet scrubber 30 which spray slurry 56 into the flue gas 16 being treated by the wet scrubber 30.

If desired, the method according to the present invention may comprise determining the concentration of oxidized ($Hg^{+2}$) and elemental ($Hg^0$) forms of mercury in the flue gases 16 entering and exiting from the wet scrubber 30 and supplying the chelating agent 50 into the slurry 56 being recirculated therein in an amount sufficient to reduce the degree to which at least one transition metal converts the $Hg^{+2}$ into the $Hg^0$ form based upon such determination. Measurements from mercury concentration sensors 58 and 60 located at the exit, and inlet, respectively, of the wet scrubber 30 may be employed for this purpose, and to determine the effectiveness of chelating agent 50 addition; signals indicative of these measurements could be sent via the dashed lines as shown to the chelating feed system 52 to automatically control the amount of chelating agent 50 supplied. Alternatively, instead of a system employing sensors, batch sampling at the exit and/or inlet of the wet scrubber 30 could be used to determine the Hg levels, and the amount of chelating agent 50 supplied would be based on such batch samples. Still further, it might be desirable to merely ensure that an excess of chelating agent 50 is provided at all times to ensure that a desired level of Hg removal is obtained.

Similarly, the method according to the present invention may comprise determining the amount of the at least one transition metal in the wet scrubber slurry and supplying the chelating agent 50 into the slurry in an amount sufficient to reduce the degree to which the at least one transition metal converts the $Hg^{+2}$ into the $Hg^0$ form based upon such determination. Alternatively, a set point could be established based on calculated or historical data and set manually. For all three cases described immediately above, operator control means 64 associated with the chelating feed system 52 could be used to establish setpoints 66, mode of operation, or perform manual control of the chelating feed system 52 as desired. The signals indicative of the measurements from the aforementioned mercury concentration sensors located at the exit 58 and inlet 60 of the wet scrubber 30 may also be sent directly to the operator control means 64 (via dashed lines as shown) which could then be used to communicate with and/or control the chelating feed system 52 via lines 68. Chelating agent 50 may be added directly to slurry 56 and/or slurry 56 may be drawn out of scrubber 30 via line 62 with agent 50 being mixed in chelating feed system 52 with the mixture of slurry 56 and chelating agent 50 subsequently reintroduced to scrubber 30 via line 54.

This invention thus generally applies to the process whereby a chelating agent 50 is added to a wet scrubber system 30 for the purpose of facilitating the removal of mercury. As described above, there are a wide variety of chelating agents and methods to introduce them into the wet scrubber 30. A person skilled in this art can determine the most effective and economical agent, as well as what quantities to use, and the most effective means of delivery. In any application, the critical feature is to ensure supplying the chelating agent into the slurry or liquid used to scrub the flue gases 16 in an amount sufficient to at least reduce the degree to which the at least one transition metal converts the $Hg^0$ into the $Hg^{+2}$ form. Similarly, for example, the particular means by which the chelating agent 50 is provided to the wet scrubber 30 is relatively unimportant, so long as some consistent and measurable means are employed so the process can be employed. The chelating agent 50 may be conveyed to the wet scrubber via pneumatic, liquid, or gravity means and introduced continuously or in batch form at desired intervals. Alternatively, the chelating agent 50 could be injected upstream of the wet scrubber 30. One or more chelating agents 50 may be employed as desired, depending upon the relative economics and the particular transition metal which is determined to be of interest and which is to be sequestered by the chelating agent. The above-identified pilot-scale testing demonstrates that a method and system for implementing same according to the present invention is feasible, effective, and practical.

To the inventor's knowledge, no prior art exists for enhanced mercury removal across wet scrubber systems using chemical additives.

FIG. 3 shows that a chelating agent 50 can be used to improve mercury removal efficiency across a wet scrubber 30 for those systems that use an ESP 26 for particulate control. The advantages of this invention are several:

1. Chelating agents 50 are well known, widely available, and relatively inexpensive.
2. Conventional wet scrubbers 30 can be used. That is, no new pollution control equipment need be installed to control mercury, except a small chemical feed system 52 (as illustrated in FIG. 1) for introducing the chelating agent 50.
3. The invention may improve the $SO_2$ removal efficiency of the wet scrubber 30 as well. In the tests described above, $SO_2$ removal increased from 95.6% to 97.9% when EDTA was added. Although this may not seem like a big improvement when presented in terms of percent removal, it represents a 24% increase in transfer units from (3.12 to 3.86) which is very significant. This is an unexpected result, and a result that would make the invention even more attractive to potential customers.
4. This invention applies to the majority of flue gas desulfurization systems used by electric utilities and is not limited in application to any particular flue gas desulfurization system or wet scrubber design.

While a specific embodiment of the invention has been shown and described in detail to illustrate the application of the principles of the invention, it will be understood that the invention may be embodied otherwise without departing from such principles. Accordingly, all such embodiments and applications of the present invention properly fall within the scope and equivalents of the following claims.

I claim:

1. A method for reducing elemental mercury concentration in industrial gases exiting from a wet scrubber which scrubs the industrial gases with a slurry, the industrial gases containing mercury in oxidized ($Hg^{+2}$) and elemental ($Hg^0$) forms, the wet scrubber containing at least one transition metal which converts the $Hg^{+2}$ into the $Hg^0$ form, comprising the steps of:

supplying a chelating agent in the slurry in an amount sufficient to reduce the degree to which the at least one transition metal converts the $Hg^{+2}$ into the $Hg^0$ form; and scrubbing the industrial gases with the slurry containing the chelating agent.

2. The method according to claim 1, wherein the chelating agent includes an active reagent and wherein the active reagent is selected from the group consisting of EDTA, HEDTA, DTPA, and NTA.

3. The method according to claim 1, comprising the steps of:

determining the amount of the at least one transition metal in the wet scrubber slurry and supplying the chelating agent into the slurry in an amount sufficient to reduce the degree to which the at least one transition metal converts the $Hg^{+2}$ into the $Hg^0$ form based upon such determination.

4. The method according to claim 3, wherein the chelating agent includes an active reagent and wherein the active reagent is selected from the group consisting of EDTA, HEDTA, DTPA, and NTA.

5. The method according to claim 1, comprising the steps of:

determining the concentration of oxidized ($Hg^{+2}$) and elemental ($Hg^0$) forms of mercury in the industrial gases entering and exiting from the wet scrubber and supplying the chelating agent into the slurry in an amount sufficient to reduce the degree to which the at least one transition metal converts the $Hg^{+2}$ into the $Hg^0$ form based upon such determination.

6. The method according to claim 5, wherein the chelating agent includes an active reagent and wherein the active reagent is selected from the group consisting of EDTA, HEDTA, DTPA, and NTA.

7. A method of operating a wet scrubber to reduce gaseous emissions of oxidized ($Hg^{+2}$) and elemental ($Hg^0$) mercury in industrial gases exiting from the wet scrubber, comprising: scrubbing the industrial gases within the wet scrubber with a slurry containing an amount of chelating agent sufficient to reduce the degree to which the at least one transition metal in the wet scrubber slurry converts the $Hg^{+2}$ into the $Hg^0$ form.

8. The method according to claim 7, wherein the chelating agent includes an active reagent and wherein the active reagent is selected from the group consisting of EDTA, HEDTA, DTPA, and NTA.

9. The method according to claim 7, comprising the step of supplying the chelating agent in an amount of about twice the stoichiometric ratio of chelating agent to the at least one transition metal.

* * * * *